May 25, 1926.　　　　　1,585,725
F. X. LAUTERBUR
DOUGH MIXER
Filed May 1, 1922　　4 Sheets-Sheet 1

Frank X. Lauterbur
INVENTOR.

BY

ATTORNEYS

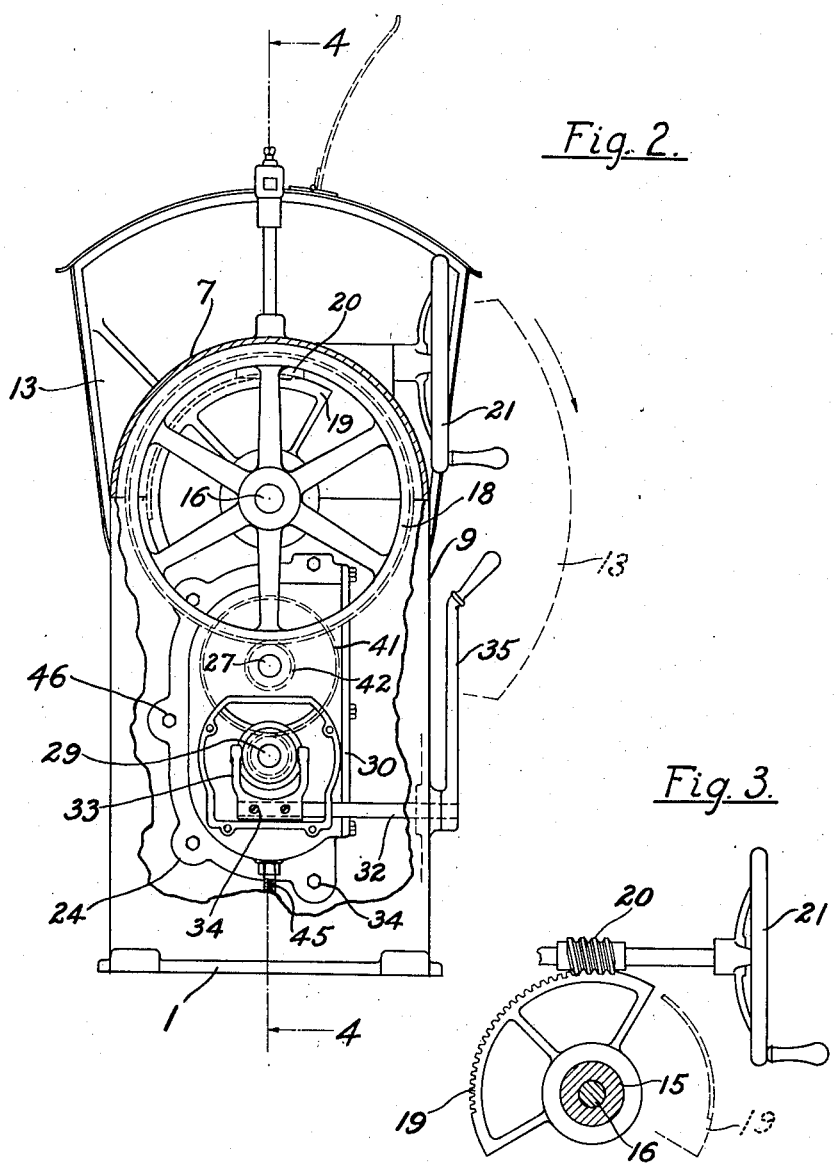

May 25, 1926.

F. X. LAUTERBUR

DOUGH MIXER

Filed May 1, 1922

Frank X. Lauterbur
INVENTOR.

BY

ATTORNEYS

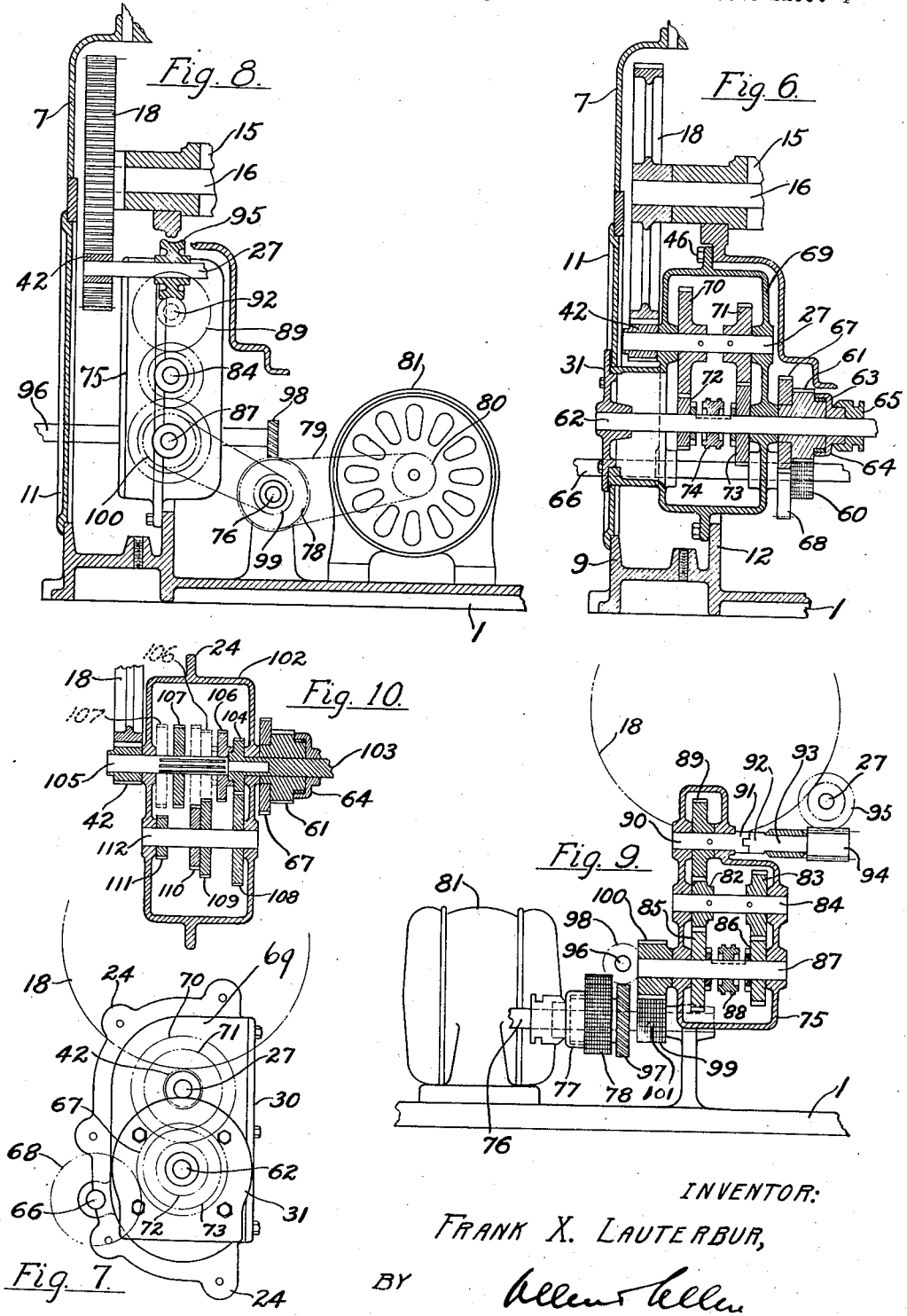

Patented May 25, 1926.

1,585,725

UNITED STATES PATENT OFFICE.

FRANK X. LAUTERBUR, OF SIDNEY, OHIO.

DOUGH MIXER.

Application filed May 1, 1922. Serial No. 557,625.

My invention relates to dough mixers and more generally to machines in which the frames and parts must be heavy and which embody clutches, motive power elements, and elements to be driven, of which dough mixers are a conspicuous example.

In a machine, either motor or belt driven, it very often happens that the element which gets out of order and causes shut downs and loss of time and money is the clutch and gearing intermediate the motive power member and the member doing the required work.

To repair a clutch or substitute new gearing often requires a return of parts to the manufacturer, since, as often happens in connection with certain types of machinery, particularly bakers' machinery, there is no facility at hand to the user whereby he can repair machinery. Also the particular parts broken or in need of repair may be of special character, not carried in stock by any but the manufacturer of the machines.

It is the object of my invention to provide a machine, more particularly a dough mixer, or other like machine in which the clutch and gear element is formed with a case of its own, and the machine frame adapted to receive this case in such a way that the user may take out the few bolts retaining the case and lift away bodily the entire transmission as a unit without affecting the remainder of the machine in any way. In this connection also I arrange so that the gearing located exterior of the case will slide into mesh with the driving and driven members without adjustment.

In this way I provide a machine which can be repaired by obtaining from the manufacturer or nearest distributor a temporary gear and clutch case, and sending back for repairs the entire unit which has been damaged.

It is also my object to provide for certain minor improvements in lubrication, ease of mounting and dismounting, improved bowl stops and various devices to be noted below.

I accomplish my objects by that certain construction and arrangement of parts to be hereinafter more specifically pointed out and claimed.

In the drawings,

Figure 2 is an end elevation thereof, partly broken away.

Figure 3 is a detail of the bowl tipping device, showing the stop function performed thereby.

Figure 6 is a detail elevation, partly in section, showing a modified form of connection for the transmission unit and a modified unit.

Figure 7 is an outline and elevation of the unit shown in Figure 6, showing the arrangement of the constant speed drive shaft.

Figure 8 is a still further modification, shown partly in section and partly in elevation.

Figure 9 is a detail front elevation of the form of unit shown in Figure 8.

Figure 10 is a detail elevation of the transmission unit showing in modified form how the gearing may be of the sliding type to effect speed changes.

Figure 1:
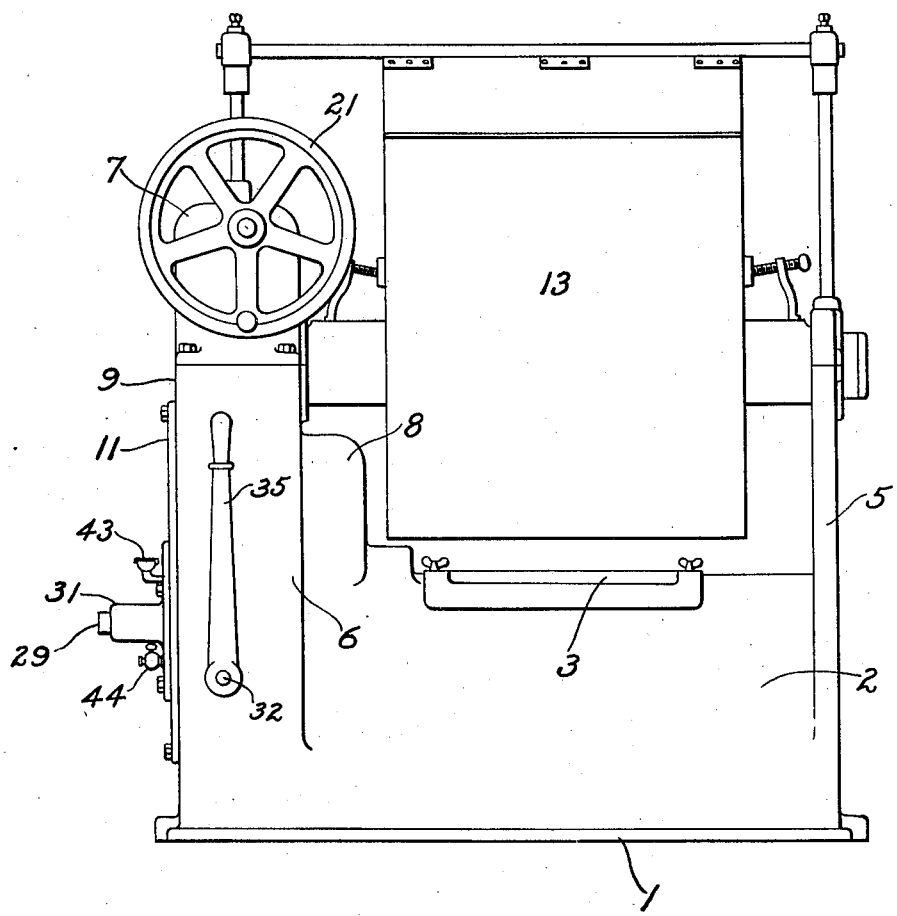
Figure 1 is a side elevation of a dough mixing machine embodying my invention.

Referring to the particular machine shown for purposes of illustration of my invention, which is essentially what is styled a small mixer, it will be noted that the frame is constructed in a special manner. On the base 1 of the frame is arranged the motor base 1ª for the motor 4. Regarding the machine from the front, the casing rises and curves back, as at 2, to form a hood overlying the motor, leaving the back of the machine open for free access. A removable cover 3 may be set in this portion of the casing or frame to facilitate inserting and removing the motor 4.

The casing is brought up at the one end in a standard 5 for supporting the free end of the bowl trunnion. At the other side and continuous with the hood portion 2, the casing on both sides is extended upwardly, as at 6, where it is fitted and bolted to a hollow casing 7 forming the other bowl trunnion support.

This portion 6 of the casing is formed with the intermediate portion 8, forming a dome-like body within which the transmission unit case fits.

The end wall 9 of the casing, beyond the portion 6, is closed except for a central opening 10, which is closed by a removable cover 11.

The casing thus forms at the transmission end, a hollow body, dome-shaped at the back, and open below the dome, closed at the sides, and open at the end of the machine through the means of a cover. Inside of this hollow body the frame is formed with a web 12, forming an outline approximating the outline of the transmission unit case, and to which this unit case is bolted. This web may be regarded as an inner vertical wall having an opening cut in it the size of the said transmission case.

The bowl 13 is formed with trunnions 14, 15, of which the trunnion 14 is supported in the end standard 5 and the other trunnion 15 in the casing portion 7.

The trunnions of the bowl support in the usual manner the shaft portions 16, 16, of the mixer blade device 17. The right hand shaft 16 extends through the trunnion 15, where it is equipped with a bull wheel or gear 18. On the outer end of the trunnion 15 is a segment gear 19, operated on by a worm 20. The teeth of the segment terminate short of the ends of the segment, and the rib on the worm is not tapered at its end, so that as the worm revolves and feeds the segment, it will come to an absolute, definite, and non-binding stop, where the teeth end. When rocking the bowl to dump it, the limit of motion will be defined by the structure of the toothed portion of the segment.

The worm is revolved by a hand wheel 21 mounted on its shaft, said shaft being supported in the casing portion 7.

The motor is equipped with a pinion 22 on its rotor shaft, although it will be understood that the motor may be omitted and the rotor shaft considered as being driven by a pulley and belt from suitable countershafting (not shown).

Figures 4, 5:
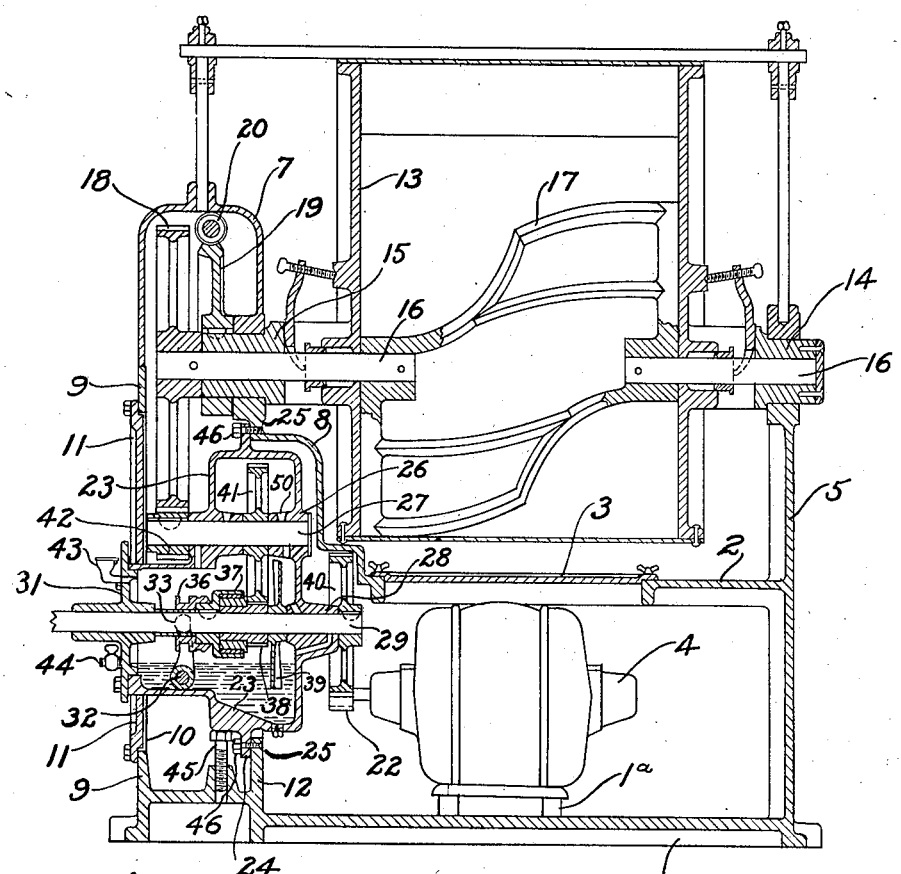
Figure 4 is a section taken on the line 4—4 of Figure 2.
Figure 5 is a detail of the removable face plate of the transmission unit, showing how a pulley may be added to the constant speed drive shaft for the purpose of driving auxiliary machinery.

Considering the transmission unit, it will be noted that a casing 23 is provided, of a shape to present a flange 24 for bolting to the web 12 at the points 25 (Figure 4). This casing provides a journal 26 for the shaft 27 and a journal 28 for the shaft 29. The one side of the case may be closed by a plate 30, and the outer end of the casing is of reduced size and is covered by a plate 31 suitably bolted into place. This plate 31 provides the other journal for the shaft 29.

When the shafts are in place and the covers bolted down, this case is entirely enclosed, so as to provide an oil reservoir.

The clutch rod 32 extends across the casing and is equipped with a clutch operating fork 33 held in place by a set screw or set screws 34. This rod is not specifically a part of the unit and is mounted in the outer frame of the machine and equipped with an operating handle 35.

Within the case 23 the shaft 29 is equipped with a clutch collar 36 and clutch 37. It has also a clutch-controlled gear 38 and a fast connected oil splash propeller 39.

On the inner end of the case, where the shaft 29 projects through it, there is located on said shaft a fast gear 40, which, when the case is set in place, will mesh with the motor pinion. This mesh may be adjusted by sliding the motor on its slotted base in the usual manner.

On the shaft 27 within the case is the gear 41 meshing with the gear 38, and on this shaft 27, outside of the case, is a pinion 42 meshing with the bull wheel or gear 18.

The outer cover plate 31 of the case is provided with an oil hole 43 and a level-detecting pet cock 44. It will be noted also that a positioning screw 45 may be provided, which assists in inserting and bolting in the gear case.

As formed of the above described parts, the device is operated and erected as follows:—

The machine frame, bowl, trunnions, mixer blade and other normal parts, exclusive of the transmission unit, are assembled in the usual manner. The machine is then complete, except for a transmission between the motor pinion and the mixer blade bull wheel.

Within the machine casing or frame there is left a large opening to be later closed by the cover 11. The transmission unit, including all of its gears, shafts, clutch collar and clutch, is then inserted into the machine and permitted to rest on the head of the positioning screw. The bolts 46 are then used to bolt the case to the frame web 12, which operation will bring the gear and pinion, carried by the case but outside thereof, into mesh with the motor pinion and mixer blade bull wheel.

The clutch rod is then inserted and the clutch fork is set in place and held with the countersunk set screws 34.

The main casing plate 11 is then mounted and bolted in place, the transmission case cover 31 bolted in place and the case filled with lubricant.

Suitable oil holes, as indicated at 50, 50, are left in the case to transmit oil to the upper shaft and the two lower shaft journals.

When the motor is started and the clutch thrown in, the transmission will couple the driving power with the mixer blade. If desired, the shaft 29 of the transmission may extend through the cover plate and carry an auxiliary belt pulley 51, which pulley will be driven, even if the mixer blades are not, as will be noted.

The clutch fork, when the clutch is thrown over to open position, will strike the base of the cover plate 31 and this feature can be employed in removing the plate, since when the bolts securing this plate in place are removed and the clutch lever operated, the said cover will be driven off its seat.

In case repairs are necessary in the transmission, a substitute case, made like the one in the machine, can be quickly substituted without manipulating any device but the clutch rod. The connection of the clutch rod with the clutch fork, does not, however, form any member in the driving train, so that an improper connection will not result in damage to the parts when the machine is being driven.

I do not desire because of the specific shape and arrangement of parts in the machine selected for purposes of illustration to thereby limit my invention to the special devices described. Many equivalents to the parts named may be substituted for them without departing from the spirit of my invention.

Referring to the modifications shown in Figures 6, 7, 8, 9 and 10, it will be noted first of Figures 6 and 8 that there is a flexible drive 60, preferably a silent chain, connected at the drive end to a sprocket on the motor (both not shown) and at the driven end to a silent chain sprocket 61. This sprocket 61 is loosely mounted on the shaft 62 and is provided with a clutch hub 63. Motion to shaft 62 is obtained by means of the clutch 64, rigidly fastened to shaft 62, and the clutch collar 65. The constant speed drive shaft 66 corresponds with the constant speed drive shaft 29 of Figures 1, 2, 4 and 5, and is driven by means of gear wheel 67, fastened to the sprocket 61, and gear wheel 68, fastened to shaft 66. The unit casing is denoted by 69. The unit includes within it a speed change mechanism, as indicated by the speed gears 70 and 71, mounted on shaft 27, the clutch gears 72 and 73, loosely mounted on the shaft 62, and the clutch member 74, slidably keyed on the said shaft 62.

Unless the clutch 74 is shifted to driving position, the shaft 62 does not revolve. The sprocket 61 revolves, however, and thus I couple to the sprocket, which is loose on the shaft, the gear wheel 67, which meshes with a gear wheel 68 mounted on shaft 66 and constitutes the auxiliary drive in the place of the shaft 29 of the parts first described.

The pinion which drives the mixing blade bull wheel is the same in this case as in the one first described.

In Figures 8 and 9 the unit casing is shown at 75, which casing is mounted as in the other instances. In this case the unit does not carry the clutch, but instead the back shaft 76 carries the clutch 77, which clutch acts to couple up the driving sprocket 78 which is shown driven by a silent chain 79 connected with a drive sprocket 80 on the motor 81.

Said unit casing 75 includes within it a speed change mechanism, as indicated by the speed gears 82 and 83, mounted on shaft 84, the clutch gears 85 and 86, loosely mounted on shaft 87, and the clutch member 88, slidably keyed on the said shaft 87. A drive gear 89 is mounted on an upper shaft 90 which is equipped with a notched collar 91 which slides into mesh with the terminal collar 92 on a worm shaft 93. The worm 94 on the shaft 93 drives the bull gear by means of an intermediate worm wheel or gear 95.

The constant speed drive shaft 96 is driven by means of the spiral gear 97, mounted on the sprocket 78, and the spiral gear 98, mounted on the shaft 96. The unit is driven by means of a drive, preferably a silent chain drive, which I have shown consisting of a drive sprocket 99, a driven sprocket 100, and a silent chain 101.

This last noted method is more cumbersome and takes up more room than those hitherto described.

It will be noted as another common feature of all of the cases, that the members 29, 66 and 96, which I have called the constant speed drive shafts, are arranged so that whenever the motor is running, they, too, are running, so that the shifting of the clutch that connects together the motor shaft and the mixer blade bull gear does not affect the operation of the auxiliary power member.

In Figure 10 the unit casing 102 is mounted the same as in the other cases. In this case the unit is similar to that shown in Figure 6, and will carry the constant speed drive shaft 66 (not shown in Figure 10 for sake of clearness). The sprocket 61 and other clutch parts are mounted on shaft 103 similarly as mounted on shaft 62.

On the end of shaft 103 is a clutch gear 104. Mounted in the casing 102 is the shaft 105 which carries the clutch gear 106 and gear 107. On shaft 105 are keys or splines so that the clutch gear 106 and gear 107 may have slidable positive movement. Gear wheels 108, 109, 110 and 111 are rigidly mounted on a shaft 112. As the gearing is arranged in Figure 10 the shaft 105 will rotate with the same velocity as shaft 103, and the shaft 112 and gears mounted thereon will run idle.

When the clutch gear 106 is shifted to the position denoted by the dotted lines 106 the power from shaft 103 will be transmitted through the gear 104, gear 106 and gear 109, and a different speed ratio thereby effected. Other positions of the gears in the unit 102 serve to effect any specific gear ratios. Between the dotted gear 107 and the gear 111 I have shown a space for the purpose of an idler gear to effect a reverse rotation should same be found advantageous.

Having thus described my invention, what

I claim as new and desire to secure by Letters Patent, is:—

1. In combination, a machine frame, an operating device to perform desired work, comprising a gear to be driven, a motive power device comprising a driving gear, intermediate gearing for connecting the said driving gear and gear to be driven, said intermediate gearing comprising shiftable elements having a frame forming a unit of said gearing, and means for demountably securing said frame into the machine frame, said intermediate gearing adapted to mesh with said driving gear and gear to be driven, upon connecting said frames together.

2. In combination, a machine frame, an operating device to perform desired work, comprising a gear to be driven, a motive power device comprising a driving gear, intermediate gearing comprising shiftable elements for connecting the said driving gear and gear to be driven, said intermediate gearing having a frame forming a unit of said gearing, and means for demountably securing said frame into the machine frame, said intermediate gearing adapted to mesh with said driving gear and gear to be driven, upon connecting said frames together, said intermediate gearing including a clutch.

3. In combination, a machine having a frame, an operating device in said frame, a motive power device connected with said frame, and a transmission device, said machine frame formed with a hollow portion, and an interior element constituting a support, a housing for the transmission device, said housing being adapted to be inserted into said hollow frame and secured to the interior element, said transmission device including members connecting to the motive power device and the operating device, said housing having a removable cover, the hollow frame having an aperture through which said housing protrudes, said removable cover being mounted on the housing outside of said aperture.

4. In combination, a machine frame, an operating device to perform desired work, a motive power device, and a transmission unit, means constituting a frame for the members of the transmission unit, and the machine frame and unit frame having means for securing them demountably together, said transmission unit comprising members adapted without further adjustment to connect the motive power device and the operating device, and supporting means within the frame of the machine to sustain the unit frame while being secured in place.

FRANK X. LAUTERBUR.